United States Patent
Rabinovitch

(10) Patent No.: US 8,803,571 B1
(45) Date of Patent: Aug. 12, 2014

(54) RESET SIGNAL PROPAGATION IN AN INTEGRATED CIRCUIT

(75) Inventor: Moshe Rabinovitch, Kiryat Bialik (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 207 days.

(21) Appl. No.: 13/351,466

(22) Filed: Jan. 17, 2012

Related U.S. Application Data

(60) Provisional application No. 61/434,313, filed on Jan. 19, 2011.

(51) Int. Cl.
*H03L 7/00* (2006.01)

(52) U.S. Cl.
USPC .......................................... 327/142; 327/141

(58) Field of Classification Search
CPC ....... H04N 1/00326; G06F 1/06; G06F 11/00; G06F 1/08; G06F 1/10; G06F 1/3237; G06F 1/324; G06F 1/3296; H03K 19/00; H03K 19/17728; H03K 19/17736; H03K 19/17748; H03K 19/17772; H03K 9/17796
USPC ........... 327/141–143; 713/300–375, 600, 601
See application file for complete search history.

(56) References Cited

U.S. PATENT DOCUMENTS

| | | | |
|---|---|---|---|
| 7,653,822 B2 * | 1/2010 | Schaver | 713/300 |
| 2007/0220281 A1 * | 9/2007 | Schaver | 713/300 |

* cited by examiner

*Primary Examiner* — Lincoln Donovan
*Assistant Examiner* — Diana J Cheng

(57) ABSTRACT

Some of the embodiments of the present disclosure provide a integrated circuit comprising a plurality of components, wherein each of the plurality of components is configured to receive a clock signal and a reset signal; a clock module configured to selectively suppress the clock signal; and a reset module configured to assert the reset signal while the clock signal is suppressed. Other embodiments are also described and claimed.

15 Claims, 3 Drawing Sheets

RESET SIGNAL PROPAGATION IN AN INTEGRATED CIRCUIT

CROSS REFERENCE TO RELATED APPLICATIONS

The present application claims priority to U.S. Patent Application No. 61/434,313, filed on Jan. 19, 2011, the entire specification of which is hereby incorporated by reference in its entirety for all purposes, except for those sections, if any, that are inconsistent with this specification.

TECHNICAL FIELD

Embodiments of the present disclosure relate to integrated circuits, and more specifically, to propagation of a reset signal in an integrated circuit.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An integrated circuit generally has numerous components, e.g., flip-flops, macros, counters, etc. These components periodically need to be reset, for example, at a start-up of the integrated circuit. A reset signal generator generally generates a reset signal, and transmits the reset signal to these components via a reset tree. Conventionally, considerable circuit design effort goes into designing the reset tree to be a balanced tree, in other words so that the time at which various components receive the reset signal is optimized or nearly optimized.

SUMMARY

In various embodiments, the present disclosure provides an integrated circuit comprising a plurality of components, wherein each of the plurality of components is configured to receive a clock signal and a reset signal; a clock module configured to selectively suppress the clock signal; and a reset module configured to assert the reset signal while the clock signal is suppressed.

In an embodiment, there is provided a method comprising transmitting, to a plurality of components of an integrated circuit, a clock signal and a reset signal; selectively suppressing the clock signal; and asserting the reset signal at least when the clock signal is suppressed.

In an embodiment, there is provided a method comprising distributing a reset signal to a plurality of components of an integrated circuit via a reset signal tree, the reset signal tree being an unbalanced signal tree; distributing a clock signal to the plurality of components of the integrated circuit via a clock signal tree, the clock signal tree being a balanced signal tree; and resetting the plurality of components, by an assertion of the reset signal, such that each of the plurality of components comes out of reset during a same clock cycle.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is noted that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
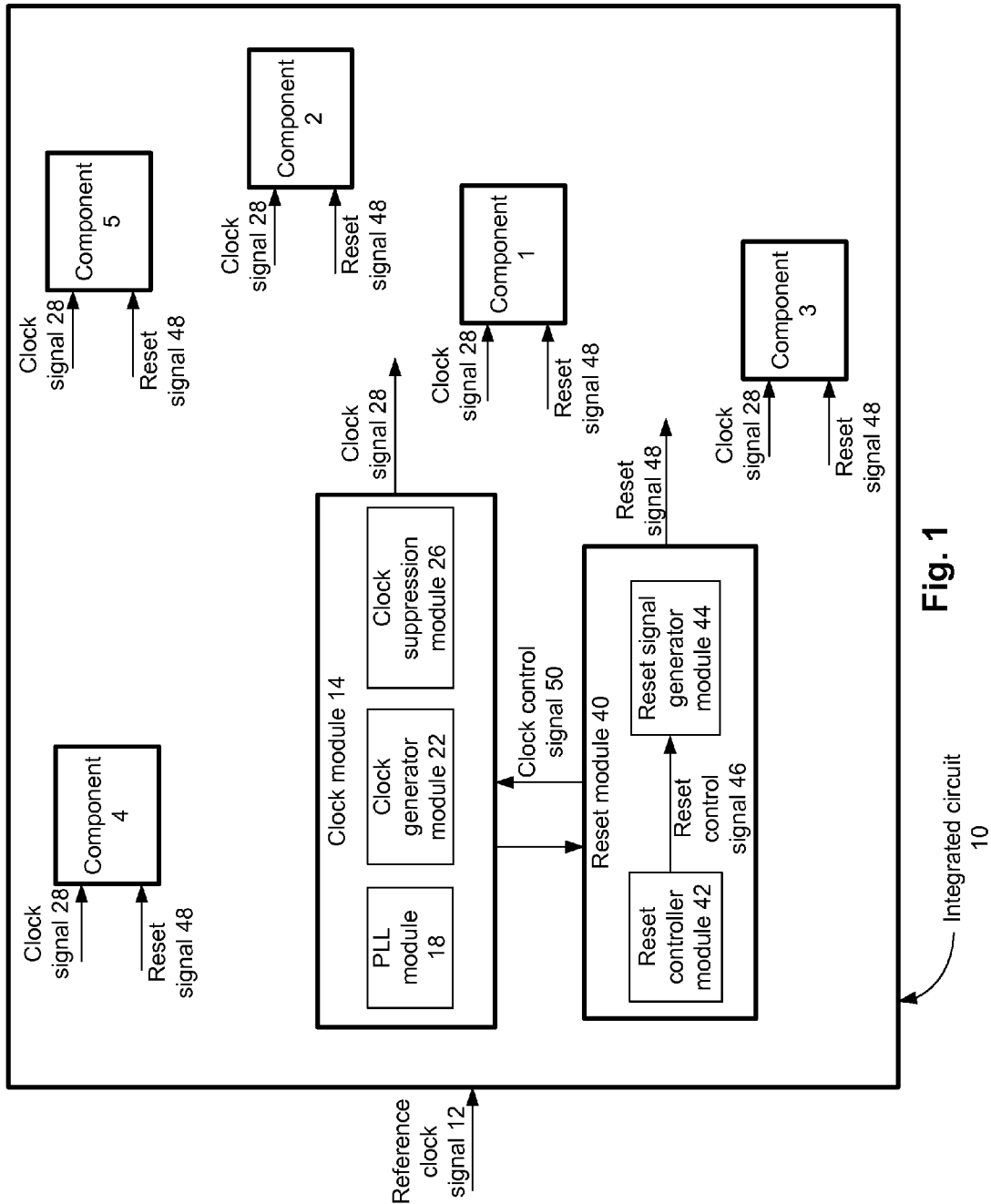
FIG. 1 schematically illustrates an integrated circuit, in accordance with an embodiment of the present disclosure.

FIG. 1 schematically illustrates an integrated circuit 10 (hereinafter referred to as "circuit 10"), in accordance with an embodiment of the present disclosure. In an embodiment, the circuit 10 is a system on a chip (SOC). The circuit 10 includes a plurality of components, e.g., components 1, . . . , 5, a clock module 14 and a reset module 40. The clock module 14 generates a clock signal 28, and the reset module 40 generates a reset signal 48. Each of the components 1, . . . , 5 receives the clock signal 28 and the reset signal 48.

In an embodiment and as will be discussed in detail herein below, the clock signal 28, received by the components 1, . . . , 5, is selectively suppressed (e.g., by the clock module 14), and the reset signal 48 is asserted (e.g., by the reset module 40) at least when the clock signal 28 is suppressed. Such selective suppression of the clock signal 28 and assertion of the reset signal 48 are, for example, in response to detecting a trigger event in the circuit 10. In an embodiment, the trigger event comprises one or more of a start-up of the circuit 10, a resetting of the circuit 10, and a resetting of the clock module 14.

Referring again to FIG. 1, in an embodiment, the components 1, . . . , 5 are any appropriate components of the circuit 10 that receives a clock signal and a reset signal. For example, the components 1, . . . , 5 comprise one or more flip-flops, counters, macros, and/or the like. Although only five components (i.e., components 1, . . . , 5) are illustrated in FIG. 1, in another embodiment, the circuit 10 includes any other appropriate number of components. When asserted, the reset signal 48 is configured to reset each of the components that receive the reset signal 48. For example, the component 1 is a flip-flop, which is reset when the reset signal 48 is asserted, and comes out of reset when the reset signal 48 is de-asserted.

In an embodiment, the circuit 10 receives a reference clock signal 12 (e.g., from an external source, e.g., a clock generation module that is external to the circuit 10), as illustrated in FIG. 1 (although in another embodiment, the reference clock signal 12 is generated internally within the circuit 10). In an embodiment and although not illustrated in FIG. 1, the clock module 14 and/or the reset module 40 receives the reference clock signal 12. In an embodiment, the reference clock signal 12 is a relatively slow clock signal compared to, for example, the clock signal 28.

In an embodiment, the clock module 14 comprises a phase lock loop (PLL) 18, a clock generator module 22, and a clock suppression module 26. The PLL 18 receives a reference clock signal (e.g., the reference clock signal 12). Based on the reference clock, the PLL 18 generates a periodically oscillating output (not illustrated in FIG. 1). The clock generator module 22 receives the output of the PLL 18, and generates the clock signal 28 based on the output of the PLL 18. The clock suppression module 26 controls the clock generator module 22 to selectively suppress the clock signal 28. In an embodiment, while the clock signal 28 is suppressed, the PLL 18 operates normally and continues generating the output, but the clock generator module 22 refrains from generating the clock signal 28 based on the output of the PLL 18. In another embodiment, the clock signal 28 is suppressed by any other appropriate manner (e.g., by disabling the PLL 18, the clock generator module 22, and/or the like). The clock module 14 transmits data to, and/or receives data from the reset module 40. In an embodiment, clock module 14 receives a clock control signal 50 from the reset module 40.

The reset module 40 comprises a reset controller module 42 and a reset signal generator module 44. The reset controller module 42 generates a reset control signal 46, based on which the reset signal generator module 44 generates the reset signal 48. In an embodiment, the reset controller module 42 also generates the clock control signal 50, and transmits the clock control signal 50 to the clock module 14. In an embodiment, a reference clock signal (e.g., the reference clock signal 12) drives one or more components of the reset module 40. As an example, the reset control signal 46, the clock control signal 50 and/or the reset signal 48 are generated based on the reference clock signal 12. In an embodiment, the reset signal 48 is a synchronous signal (e.g., the reset signal is generated synchronously with the reference clock signal 12 and/or the clock signal 28). In another embodiment, the reset signal 48 is an asynchronous signal (e.g., is not synchronized with the reference clock signal 12 and/or the clock signal 28).

Although FIG. 1 illustrates the reset controller module 42 being separate from the reset signal generator module 44, in various other embodiments (and not illustrated in FIG. 1), the reset signal generator module 44 performs the functionally of the reset controller module 42 (e.g., there is no separate reset controller module 42, and no reset control signal 46). In some of these embodiments, the reset signal generator module 44 generates the reset signal 48 and the clock control signal 50 (but does not generate any reset control signal).

The components 1, . . . , 5 are distributed throughout the circuit 10. For example, one or more of the components (e.g., component 1) may be physically located closer to the clock module 14 and/or the reset module 40, while another one or more of the components (e.g., component 5) may be physically located further from the clock module 14 and/or the reset module 40. The clock signal 28 is transmitted to the components 1, . . . , 5 via a clock tree (not illustrated in FIG. 1). In an embodiment, the clock tree is a balanced signal tree. For example, time taken for the clock signal 28 to reach, from the clock module 14, to each of the components 1, . . . , 5 is substantially same. Thus, each of the components 1, . . . , 5 receives, for example, a rising edge of the clock signal 28 at substantially the same time. Accordingly, the clock signal 28 has to meet certain timing requirements (e.g., reach the components 1, . . . , 5 of the circuit 10 at substantially the same time).

In an embodiment, the reset signal 48 is transmitted to the components 1, . . . , 5 through a reset tree (not illustrated in FIG. 1). In an embodiment, the reset tree is an unbalanced signal tree. For example, time taken for the reset signal 48 to reach, from the reset module 40, to each of the components 1, . . . , 5 may be different. For example, time taken for the reset signal 48 to reach a given component of the components 1, . . . , 5 is based on, for example, a physical distance of the given component from the reset module 40. In another example, time taken for the reset signal 48 to reach a given component of the components 1, . . . , 5 is based on one or more components (e.g., one or more buffers, which may be a part of the reset tree, not illustrated in FIG. 1), through which the reset signal 48 is transmitted, before reaching the given component.

Figure 2:
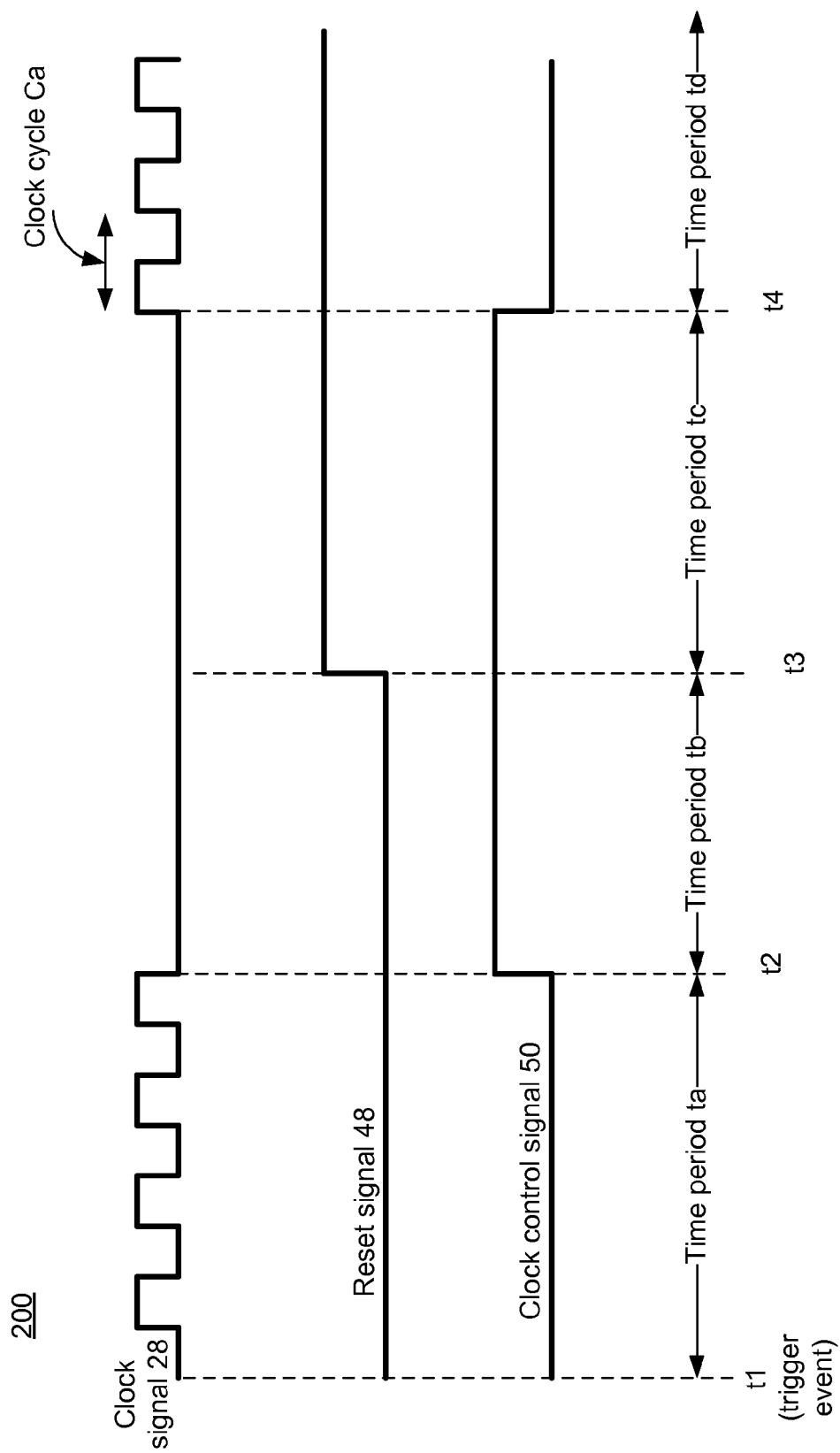
FIG. 2 illustrates a timing diagram of various signals of the integrated circuit of FIG. 1, in accordance with an embodiment of the present disclosure.

FIG. 2 illustrates a timing diagram 200 of various signals of the circuit 10 of FIG. 1, in accordance with an embodiment of the present disclosure. FIG. 2 illustrates variations of the clock signal 28, the reset signal 48, and the clock control signal 50 of FIG. 1.

In the example timing diagram of FIG. 2, the reset signal 48 is asserted when the reset signal 48 has a low value, and is de-asserted when the reset signal 48 has a high value. Thus, when a component of the components 1, . . . , 5 receives a low value of the reset signal 48, the component gets reset; and when the component receives a high value of the reset signal 48, the component comes out of the reset. However, in another embodiment and although no illustrated in FIG. 2, the opposite may be true (i.e., the reset signal 48 may asserted and de-asserted when the reset signal 48 has a high value and a low value, respectively).

In an embodiment, the reset signal 48 is asserted based on an assertion of the reset control signal 46, and the reset signal 48 is de-asserted based on a de-assertion of the reset control signal 46. Accordingly, in an embodiment, timing patterns of the reset signal 48 and the reset control signal 46 are substantially similar. Hence, the timing diagram 200 of FIG. 2 does not separately illustrate the timing pattern of the reset control signal 46. In various other embodiments and as previously discussed (although not illustrated in FIG. 1), the reset module 40 generates the reset signal 48, but does not generate a separate reset control signal 46.

In the example timing diagram of FIG. 2, the clock control signal 50 is asserted when the clock control signal 50 has a high value, and is de-asserted when the clock control signal 50 has a low value. For example, when the clock control signal 50 has a high value, the clock suppression module 26 suppresses the clock signal 28. When the clock control signal 50 has a low value, the clock suppression module 26 refrains from suppressing the clock signal 28.

Referring again to the timing diagram of FIG. 2, a trigger event occurs at or prior to time t1. The trigger event occurs, for example, during a start-up of the circuit 10, when the circuit 10 is reset, when the clock module 14 and/or the reset module 40 included in the circuit 10 are reset, and/or the like. In an embodiment, the trigger event occurs whenever one or more of the components 1, . . . , 5 need to be reset.

From time t1 to time t2 (where time t2 occurs subsequent to time t1, and where a time period between time t1 and time t2 is a time period ta), the clock control signal 50 remains de-asserted, thereby enabling the clock module 14 to generate the clock signal 28 (e.g., the clock signal 28 toggles between a high and a low value). Also during the time period ta, the reset signal 48 remains asserted. As previously discussed, the clock signal 28 and the reset signal 48 are distributed to the components 1, . . . , 5 via a clock tree and a reset tree, respectively. The clock signal 28 and the reset signal 48 do not instantaneously reach the components 1, . . . , 5. In an embodiment, the reset tree is not a balanced tree, and each of the components 1, . . . , 5 receive the asserted reset signal 48 at some time between time t1 and time t2. Each of the components 1, . . . , 5 may receive the asserted reset signal 48 at different times, e.g., based on a distance of the component from the reset module 40.

In an embodiment, during the time period ta, the PLL module 18 and/or one or more other components of the clock module 14 stabilize (e.g., in the case the circuit 10 started up or was reset at time t1). Thus, during the time period ta, the clock signal 28 stabilizes. In an embodiment, a duration of the time period ta is based on a time taken by the PLL module 18 and/or other components of the clock module 14 to stabilize and generate a stable clock signal 28. Additionally or alternatively, the duration of the time ta may also be based on a time taken by the reset signal 48 to reach each of the components 1, . . . , 5.

At time t2, the clock control signal 50 is asserted (e.g., by the reset controller module 42). Accordingly, the clock suppression module 26 suppresses the clock signal 28 (e.g., prevents the clock signal 28 from toggling between the high and low value) from time t2. Between time t2 and time t3 (where time t3 occurs subsequent to time t2, and where a time period between time t2 and time t3 is a time period tb), the reset signal 48 remains asserted. In an embodiment, prior to an end of the time period tb, the asserted reset signal 48 reaches each of the components 1, . . . , 5. In an embodiment, the time periods ta and/or tb are determined based on a maximum time taken by the reset signal 48 to reach each of the components 1, . . . , 5. In an embodiment, the time periods ta and/or tb are based on, for example, a size of the circuit 10 (e.g., the larger the size of the circuit 10 is, the longer the reset signal 48 takes to reach all the components 1, . . . , 5), a speed of propagation of the reset signal 48 to the components 1, . . . , 5, and/or the like.

At time t3, the reset signal 48 is de-asserted. A time period between time t3 and time t4 (which occurs subsequent to time t3) is a time period tc. The clock control signal 50 remains asserted until time t4 (i.e., the clock control signal 50 remains asserted during time period tc). Accordingly, the clock signal 28 remains suppressed during time period tc, as illustrated in FIG. 2. Prior to the end of the time period tc, each of the components 1, . . . , 5 receives the de-asserted reset signal 48. Accordingly, the time period tc has to be sufficiently large to allow the de-asserted reset signal 48 to propagate to each of the components 1, . . . , 5. In an embodiment, the time period tc is determined based on a maximum time taken by the de-asserted reset signal 48 to reach each of the plurality of components 1, . . . , 5. In an embodiment, the time period tc is based on, for example, a size of the circuit 10, a speed of propagation of the reset signal 48 to the components 1, . . . , 5, and/or the like.

At time t4, the clock control signal 50 is de-asserted by the reset controller module 42. Accordingly, the clock suppression module 26 refrains from suppressing the clock signal 28, and the clock signal 28 starts toggling periodically between the low and high values. Time period td comprises time subsequent to the time t4. During the time period td, the regular clock signal 28 propagates towards the components 1, . . . , 5. A first clock cycle of the clock signal 28, after the suppression of the clock signal 28 ends, is a clock cycle Ca, as illustrated in FIG. 2. In an embodiment, the clock tree is a balanced clock tree, and each of the components 1, . . . , 5 receives the clock cycle Ca at substantially the same time. Each of the components 1, . . . , 5 gets out of the reset mode (e.g., starts operating at regular mode) at the clock cycle Ca.

It is noted that the clock signal 28 is selectively suppressed, that is suppressed, for example while asserting the reset signal 48, as illustrated in FIG. 2. As a result, for example, all the components 1, . . . , 5 get out of the reset mode at the clock cycle Ca. In an embodiment, each of the components 1, . . . , 5 may receive the asserted reset signal 48 at different time (e.g., due to the unbalanced reset tree). However, all of these components come out of the reset mode during the same clock cycle (i.e., clock cycle Ca). Thus, although the reset tree is unbalanced, all the components 1, . . . , 5 come out of the reset mode logically during the same clock cycle. This ensures, for example, that all the components 1, . . . , 5 have substantially synchronized logical reset operation. The circuit 10 does not need a balanced reset tree (thereby saving additional cost and space associated with a balanced reset tree), yet the components 1, . . . , 5 comes out of the reset at the same clock cycle. Unlike a reset signal of a conventional circuit, the reset signal 48 of the circuit 10 does not need to meet a stringent timing requirement of reaching the components 1, . . . , 5 at substantially the same time.

Figure 3:
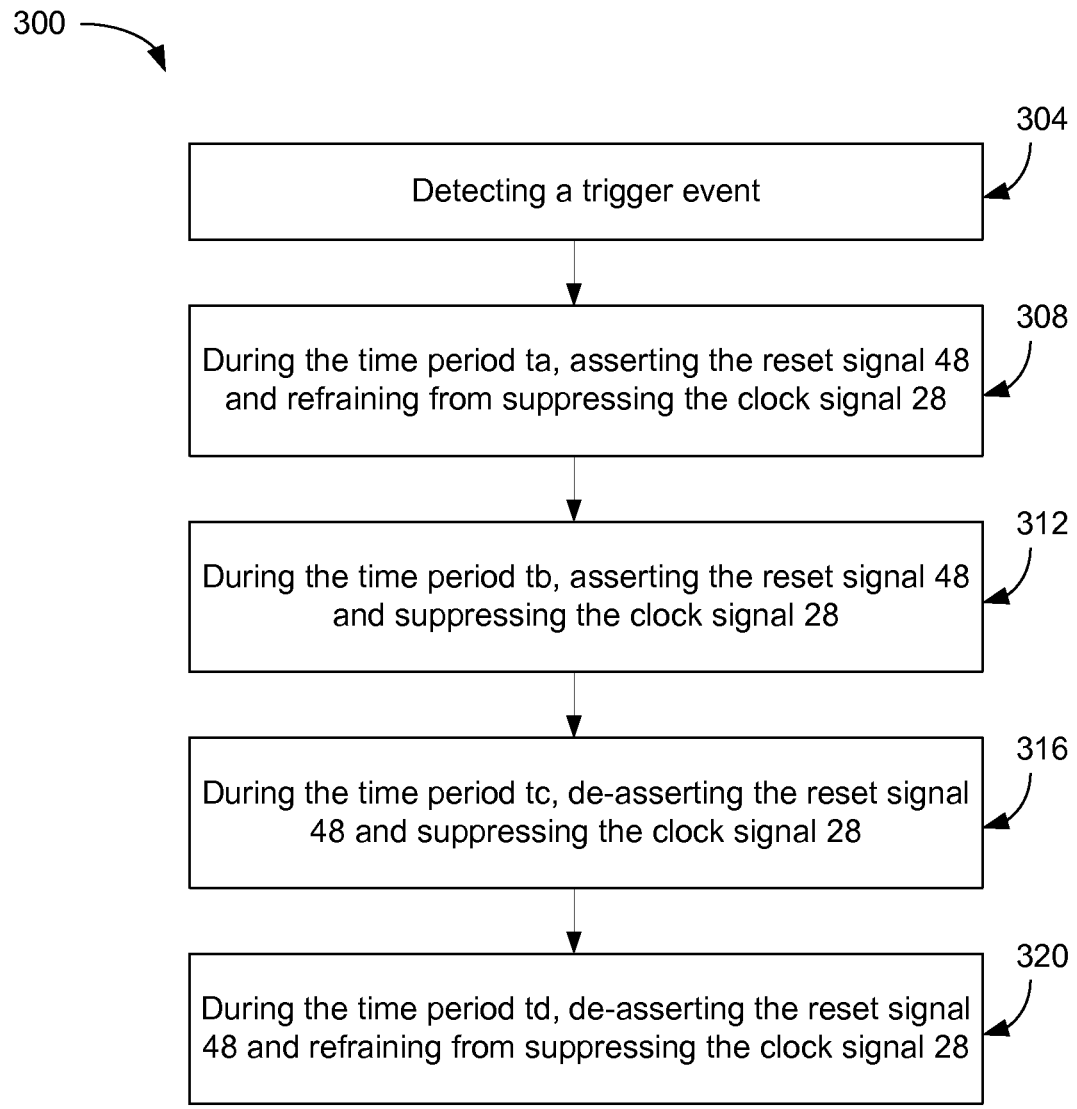
FIG. 3 illustrates an example of a method for operating the integrated circuit of FIG. 1, in accordance with an embodiment of the present disclosure.

FIG. 3 illustrates an example of a method 300 for operating the circuit 10 of FIG. 1, in accordance with an embodiment of the present disclosure. Referring to FIGS. 1-3, at 304, a trigger event is detected, e.g., at time t1, by the reset module 40 (e.g., by the reset controller 42). In an embodiment, the trigger event comprises one or more of a start-up of the circuit 10, a resetting of the circuit 10, and a resetting of the clock module 14.

At 308, in response to detecting the trigger event, during the time period ta (which commences in response to the trigger event), the reset module 40 asserts the reset signal 48 and the clock module 14 refrains from suppressing the clock signal 28. At 312, during the time period tb (which commences subsequent to the time period ta), the reset module 40 continues asserting the reset signal 48 and the clock module suppresses the clock signal 28. At 316, at the beginning of the time period tc (which commences subsequent to the time period tb), the reset module 40 de-asserts the reset signal 48. Also at 316, the clock module 14 continues suppressing the clock signal 28. At 320, during the time period td (which commences subsequent to the time period tc), the reset module 40 continues de-asserting the reset signal 48. Also at 320, from the beginning of the time period td, the clock module 14 refrains from suppressing the clock signal 28.

In accordance with an embodiment, an article of manufacture may be provided that includes a storage medium having instructions stored thereon that, if executed, result in the operations described herein with respect to the method 300 of FIG. 3 (and/or various other operations discussed in the present disclosure). In an embodiment, the instructions, if executed, result in the operations performed by the circuit 10 of FIG. 1 (e.g., by the clock module 14 and/or the reset module 40). In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. An integrated circuit comprising:
a plurality of components, wherein each of the plurality of components is configured to receive a clock signal and a reset signal;
a reset module configured to (i) assert the reset signal subsequent to a trigger event and prior to a commencement of a first time period, (ii) assert the reset signal during the first time period, and (ii) de-assert the reset signal following the first time period; and
a clock module configured to (i) suppress the clock signal during the first time period, and (ii) refrain from suppressing the clock signal subsequent to the trigger event and prior to the commencement of the first time period.

2. The integrated circuit of claim 1, wherein:
in response to the trigger event, (i) the clock module is configured to selectively suppress the clock signal and (ii) the reset module is configured to assert the reset signal; and
the trigger event comprises one or more of a start-up of the integrated circuit, a resetting of the integrated circuit, and a resetting of the clock module.

3. The integrated circuit of claim 1, wherein:
the clock module is further configured to suppress the clock signal during a second time period that commences subsequent to an end of the first time period; and
the reset module is further configured to keep the reset signal de-asserted during the second time period.

4. The integrated circuit of claim 3, wherein (i) the first time period and (ii) the second time period are based on a time taken by the reset signal to reach the plurality of components.

5. The integrated circuit of claim 3, wherein:
the clock module is further configured to refrain from suppressing the clock signal during a third time period that commences subsequent to an end of the second time period; and
the reset module is further configured to keep the reset signal de-asserted during the third time period.

6. The integrated circuit of claim 1, further comprising:
a reset tree configured to distribute the reset signal to the plurality of components, the reset tree being an unbalanced signal tree; and
a clock tree configured to distribute the clock signal to the plurality of components, the clock tree being a balanced signal tree.

7. The integrated circuit of claim 1, wherein one or more of the plurality of components comprise one or more of flip-flops, macros and counters.

8. The integrated circuit of claim 1, wherein the reset signal is one of a synchronous reset signal and an asynchronous reset signal.

9. The integrated circuit of claim 1, wherein each of the plurality of components is reset when the corresponding component receives the asserted reset signal.

10. A method comprising:
transmitting, to a plurality of components of an integrated circuit, a clock signal and a reset signal;
asserting the reset signal (i) subsequent to a trigger event and prior to a commencement of a first time period, and (ii) during the first time period;
de-asserting the reset signal following the first time period;
suppressing the clock signal during the first time period; and
refraining from suppressing the clock signal subsequent to the trigger event and prior to the commencement of the first time period.

11. The method of claim 10, further comprising:
detecting the trigger event.

12. The method of claim 10, further comprising:
during a second time period that commences subsequent to an end of the first time period, suppressing the clock signal; and
during the second time period, de-asserting the reset signal.

13. The method of claim 12, further comprising:
during a third time period that commences subsequent to an end of the second time period, refraining from suppressing the clock signal; and
during the third time period, de-asserting the reset signal.

14. The method of claim 10, wherein:
transmitting the reset signal further comprises transmitting the reset signal to the plurality of components via a reset signal tree, the reset signal tree being an unbalanced signal tree; and
transmitting the clock signal further comprises transmitting the clock signal to the plurality of components via a clock signal tree, the clock signal tree being a balanced signal tree.

15. A method comprising:
distributing a reset signal to a plurality of components of an integrated circuit via a reset signal tree, the reset signal tree being an unbalanced signal tree;
distributing a clock signal to the plurality of components of the integrated circuit via a clock signal tree, the clock signal tree being a balanced signal tree;
resetting the plurality of components, by an assertion of the reset signal, such that each of the plurality of components comes out of reset during a same clock cycle;
detecting a start-up event of the integrated circuit;
in response to detecting the start-up event, selectively suppressing the clock signal;
in response to detecting the start-up event, asserting the reset signal when the clock signal is selectively suppressed; and
in response to detecting the start-up event, asserting the reset signal when the clock signal is not suppressed.

* * * * *